(12) United States Patent
Winterowd et al.

(10) Patent No.: US 7,728,096 B2
(45) Date of Patent: Jun. 1, 2010

(54) ADHESIVE HAVING AROMATIC DIISOCYANATES AND AROMATIC PETROLEUM DISTILLATES WITH LOW VOLATILITY FOR USE IN ENGINEERED WOOD PRODUCTS

(75) Inventors: Jack G Winterowd, Puyallup, WA (US); Erik M Parker, Boise, ID (US); Cheng Zhang, Seattle, WA (US); Daniel V Hanson, Auburn, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 773 days.

(21) Appl. No.: 11/609,535

(22) Filed: Dec. 12, 2006

(65) Prior Publication Data

US 2008/0135173 A1 Jun. 12, 2008

(51) Int. Cl.
*C08G 18/00* (2006.01)
*C08G 18/02* (2006.01)
*C08G 18/72* (2006.01)
*C09J 101/00* (2006.01)
*B27N 3/00* (2006.01)

(52) U.S. Cl. .............................. 528/44; 528/59; 524/13; 524/589; 527/301; 264/109; 264/122; 156/331.4

(58) Field of Classification Search ................. 156/337, 156/331.4; 106/273.1; 264/109, 126, 122; 523/205; 528/44, 59; 524/13, 589; 527/301
See application file for complete search history.

(56) References Cited

U.S. PATENT DOCUMENTS

| 6,287,495 B1 * | 9/2001 | Rosthauser | 264/109 |
| 6,352,661 B1 * | 3/2002 | Thompson et al. | 264/109 |

* cited by examiner

*Primary Examiner*—Randy Gulakowski
*Assistant Examiner*—Michael Pepitone

(57) ABSTRACT

The present invention is an adhesive suitable for use in the production of engineered wood products, said adhesive comprised of an aromatic diisocyanate (99.0-10.0 parts by mass) and an aromatic petroleum distillate (1.0-90.0 parts by mass) with low volatility. The adhesive composition may result in improved coverage or distribution on the outer surface of raw materials, such as strands, particles, flakes, fibers, or veneer.

10 Claims, No Drawings

ADHESIVE HAVING AROMATIC DIISOCYANATES AND AROMATIC PETROLEUM DISTILLATES WITH LOW VOLATILITY FOR USE IN ENGINEERED WOOD PRODUCTS

FIELD OF THE INVENTION

This invention relates generally to an adhesive suitable for use in the production of engineered wood products.

BACKGROUND OF THE INVENTION

Wooden strand-based composite products, such as oriented strandboard (OSB), flakeboard, waferboard or TimberStrand, are commonly used in residential home construction. They can be formed from raw materials, such as wooden elements, such as strands and flakes. These wood products are generally manufactured in seven major stages, which may include stranding, screening, drying, blending, forming, pressing, and finishing.

Stranding is a process in which logs are cut into discrete wooden strands (also known as flakes) that typically have an aspect ratio between 1 and 20. The long axis of the strands is predominantly aligned within about 0-30° of the grain of the wood. The strand thickness can range from about 0.015" to about 0.060" and the length can range from about 1" to about 15", or even longer. In most cases, the strands are cut from round wood that has a moisture content of about 50-150%. Thus, the stranding process typically yields wet strands that must be dried prior to further processing.

Drying is usually accomplished by passing the wet strands through long rotating drums or pipes in conjunction with hot, dry air. Alternatively, strands can be dried by conveying them in a chamber with hot, dry air passing through or around the conveyance system. The drying process commonly results in strands that have a moisture content of about 1-7%. The resulting dried strands exist as a mixture of relatively large and small elements, and it is frequently desirable to screen the material in order to separate the strands on the basis of size. In many cases the smallest wooden particles, known as fines, are diverted from the product stream and are transported to a burner where they are used as fuel.

The acceptable wooden strands are then metered into large rotating drums, known as blenders, and are sprayed or otherwise mixed with bonding resin and wax. This stage is known as blending. Many blenders rotate at a rate of about 4-20 rpm and are tilted (3-8°) in order to promote material flow. A single blender can have about six or more liquid application devices distributed within it. Such application devices are frequently rotary disk atomizers, but they can also be simple spray guns. In some cases, one or two of the application devices are devoted to wax and the remaining application devices are devoted to resin. Powdered bonding resins can also be introduced into the blender. It is common for large strands and small strands to be blended separately. Strands that have been treated with bonding resin and wax are then formed into a mat. In the case of OSB and TimberStrand, treated strands are formed into a mat by dispensing them at some controlled rate through mechanical partitions that tend to align the strands in a particular orientation. As the strands pass through the alignment devices they are collected onto a continuous conveyor belt. In the case of waferboard, the strand alignment devices are not used, and the mat that collects on the conveyor belt has an essentially random orientation within the plane of the mat, which is parallel to the conveyor belt. Frequently, the strands incorporated into the top and bottom layers of an OSB mat are larger than the strands incorporated into the core (or middle) layer of the mat. In many cases the bonding resin formulas and resin application levels used in the surface layers of an OSB mat are different than those used in the core layer of the mat. In a commercial manufacturing process the mat is generally continuous in length and has a width of between about 4' and 16'. The thickness of the mat can be in the range of about 2" to 20". In some cases, the continuous mat of treated strands is transported directly into a continuous hot-press, but in most cases, the mat is cut into discrete sections, which can have a length of about 8' to 24'. These mat sections are loaded into a multi-opening hot press, which can usually press between 12 and 20 mats simultaneously. In the case of TimberStrand, the mat is loaded into a single-opening, steam-injection press.

During the process of pressing, strands are forced together and intimate contact is achieved at the strand-to-strand interfaces. Subsequent to this consolidation process, bond formation occurs as the resin undergoes curing reactions and is converted from a liquid to a load-bearing solid. The press then opens and the relatively large "jumbo" panels are ejected onto a conveyor and transported to the finishing stages of the operation. Finishing steps commonly include cutting the jumbo panels into smaller panels, such as those having dimensions of 4"×8". Other finishing activities can include sanding, edge profiling, marking with grade stamps, grading for quality, stacking into units, sealing, labeling, strapping and packaging.

Other engineered wood-based composite products, such as medium density fiberboard (MDF), particleboard, plywood, and laminated veneer lumber, are manufactured in processes that are generally similar to that of the wooden strand-based composites.

Adhesives, or binder resins, which are commonly utilized in the blending step of the production process for wooden strand-based composites include polymeric diphenylmethane diisocyanate (pMDI), such as Huntsman's Rubinate 1840, liquid phenol/formaldehyde resole resins, such as Georgia-Pacific's 70CR66 resin; and powdered phenol/formaldehyde resole resins, such as Hexion's W3154N resin. Binders are typically applied to strands at a level of about 1-8%. In general, these adhesive types have worked well for this application, but manufacturers are constantly searching for resins that will facilitate improved distribution on the strands at minimal application rates. It is well known in the industry that binder distribution (i.e. the percentage of strand surface area covered with adhesive) can be improved by increasing the resin application rate. Indeed, increasing the resin application rate results in improved resin distribution and increased strand-to-strand bond strength. Unfortunately, high resin application rates also increase production costs and increase the rate of "build-up" or fouling of the interior surface of the blender. Conversely, decreasing the resin application rate reduces production costs and reduces the rate of "build-up" on the inside of the blender, but it also has a detrimental effect on resin distribution and strand-to-strand bond strength. When resin distribution is sufficiently poor, a significant portion of the strand population will be essentially free of adhesive on at least one major side. If two untreated strand surfaces are in direct contact in the finished board, then there will be essentially no internal bond strength at the interface between these strands. Products with many of these weak interfaces would be expected to perform poorly in a structural application. Among conventional resins, powdered phenol/formaldehyde resole resins tend to yield very good distribution at low application rates. Unfortunately, these resins are relatively expensive compared to liquid phenol/formaldehyde resins, they are "dusty", and the application level of the powder is limited to about 3% of the strand mass, which might be insufficient to achieve a desired level of performance in the board. Higher resin loading levels can be achieved by use of pMDI or liquid phenol/formaldehyde resole resin. The extent of distribution for liquid binders is partially related to resin droplet size, which generally decreases as the resin viscosity decreases. Therefore, there is some tendency for lower viscosity liquid binders to yield improved distribution in a given application system. It is also known that there is a tendency for pMDI to absorb into a wooden strand faster and to a greater extent than that of a liquid phenol/formaldehyde resole resin. Thus, pMDI tends to yield better distribution than a liquid phenol/formaldehyde resole resin, even when they both have the same viscosity and are applied at the same level.

Accordingly, a need exists for a resin composition that can be applied to strands in a conventional blender at a given application rate wherein the resin yields improved distribution relative to that achieved with a conventional liquid resin.

DETAILED DESCRIPTION OF THE INVENTION

The present invention is an adhesive suitable for use in the production of engineered wood products, said adhesive comprised of an aromatic diisocyanate (99.0-10.0 parts by mass) and an aromatic petroleum distillate (1.0-90.0 parts by mass) with low volatility. The adhesive composition may result in improved coverage or distribution on the outer surface of raw materials, such as strands, particles, flakes, fibers, or veneer.

Aromatic diisocyanate compounds suitable for this invention include 2,4'-methylene bis(phenylisocyanate), 4,4'-methylene bis(phenylisocyanate), 1,5'-naphthalenediisocyante, 2,4-toluene diisocyanate, and pMDI which is a mixture of methylene bis(phenylisocyanate) isomers and analogous oligomers.

Aromatic petroleum distillates with low volatility that may be suitable for this invention are liquid compounds or mixtures of liquid compounds that are isolated by distillation of petroleum and are liquids at standard temperature (25° C.) and pressure (760 Torr) and have boiling points in excess of about 220° C. @ 760 torr. Commercially available examples of aromatic petroleum distillates with low volatility (i.e., boiling points in excess of about 220° C. @ 760 torr) include Viplex 222 and Vycel U-2000, both of which are available from the Crowley Chemical Company [New York, N.Y.].

The term "aromatic" means that the compound contains at least one ring that has a conjugated $\pi$ electron system with $(4n+2)$ $\pi$ electrons, where n is an integer such as 0, 1 or 2. Most commonly these aromatic compounds will contain at least one six-membered ring in which 6 $\pi$ electrons are associated with 3 conjugated double bonds. It is also typical for aromatic compounds to contain two or more fused six-membered ring systems, such that the fused ring system contains $(4n+2)$ $\pi$ electrons. Simple examples Of aromatic compounds, which are not suitable for this invention, include benzene (one six-membered ring having six $\pi$ electrons) and naphthalene (two fused six-membered rings having ten $\pi$ electrons in the ring system). The term "$\pi$ electrons" comes from molecular orbital theory and is ascribed to bonding electrons that have a particular energy level and reside in a particular location in the molecule. For a more detailed explanation of aromaticity and $\pi$ electrons see *Advanced Organic Chemistry* by Jerry March.

Mix ratios suitable for this invention are generally in the range of 90.0-10.0 parts by mass of the aromatic diisocyanate and 10.0-90.0 parts by mass of the aromatic petroleum distillate. In some embodiments, the mix ratios for this invention are 85.0-40.0 parts by mass of the aromatic diisocyanate and 15.0-60.0 parts by mass of the aromatic petroleum distillate. Although not required, other compounds, such as esters, surfactants, fungicides, insecticides, moldicides and/or colorants can be incorporated into the adhesive formulation at levels which will typically be less than about 20% of the total formulation. These additions are within the scope of this invention.

Agitation required during the process of mixing the aromatic diisocyanate and the aromatic petroleum distillate will generally be minimal as long as each of the components is low in viscosity. Mixing must be sufficient to ensure that the components are homogenously blended into a single-phase solution. In an embodiment, the mixing occurs over a temperature range of about 0-60° C., although mixing can be accomplished at temperatures outside this range. In an embodiment, the mixing is conducted in a closed container that is free of moisture in order to preserve the shelf-life of the diisocyanate. As long as the mixture is protected from moisture and other compounds that contain nucleophilic functional groups, the mixture may have a shelf-life that is similar to that of the diisocyanate. Thus, the mixture can be transferred into totes, trucks, rail cars or other storage containers and transported to a mill in a manner that is similar to that used today for conventional liquid adhesives.

In an embodiment, the adhesive is formed as a mixture of an aromatic diisocyanate (90.0-10.0 parts by mass); an aromatic petroleum distillate (10.0-90.0 parts by mass); and an aromatic ester (0.1-10.0 parts by mass). The aromatic ester may be, for example, phenyl acetate, phenyl phthalate, phenyl salicylate, phenyl benzoate, phenyl carbonate, salicylic acid acetate, 2-naphthyl benzoate, 2-naphthyl lactate, 1-naphthyl salicylate, _2-naphthyl salicylate, n-butyl phthalate, dioctylphthalate (DOP), n-butylbenzoate, benzyl formate, benzyl acetate, benzyl salicylate, benzyl benzoate, and benzyl fumarate.

Adhesives described in this invention are typically stable, low viscosity liquids that can be easily dispensed by use of rotary disk atomizers, such as that produced by Coil Manufacturing Ltd., or spray guns, such as that produced by Graco Incorporated. Application rates onto strands during the process of manufacturing a wooden strand-based composite can generally be in the range of about 1.0-8.0%. The adhesive can be applied to either the strands destined for the core layer of the board, or those destined for the surface layer of the board, or both.

In an embodiment, a system is provided for attaching a plurality of raw materials. The system has a first raw material; and a second raw material. The system also has an adhesive applied to at least one of the first raw material and the second raw material wherein the adhesive comprises aromatic diisocyanate (90.0-10.0 parts by mass); an aromatic petroleum distillate (10.0-90.0 parts by mass) and a aromatic ester (0.1-10.0 parts by mass).

EXAMPLE 1

A 1-L glass beaker was charged with pMDI (250 g) and an aromatic petroleum distillate known as Viplex 222 (250 g). The mixture was gently stirred for about 30 s with a metal spatula, which was sufficient to yield a homogenous, single-phase solution. This binder was then used to make OSB panels on a laboratory scale as described in the following paragraph.

Aspen strands were screened in order to remove particles less than ⅛" in size and the residual material was dried to a moisture content of about 2%. A portion of these strands were designated as surface layer strands and were loaded into a blender and sprayed with a liquid phenol/formaldehyde resin produced by Hexion Specialty Chemicals, Incorporated [Springfield, Oreg.], known as W132D, at a loading level of 6%. These surface layer strands were also sprayed with molten slack wax at a level of 0.75%. A second portion of strands were designated as core layer strands and were loaded into a blender and sprayed with the previously described mixture of pMDI and Viplex 222 at a loading level of 4%. These core layer strands were also sprayed with molten slack wax at a level of 0.75%. The treated strands were formed on a screen into an oriented, 3-layered mat (24"×24") that was comprised of 50% surface layer strands and 50% core layer strands by mass. The mat (with screen) was pressed between hot platens (390° F.) for a total period of 280 s, which included a 60 s closing period and a 30 s decompression period. The resulting board was removed from the press and immediately transferred into a hot oven (176° F.) for a period of 24-hours. The resulting board had a thickness of about 0.720" and was trimmed to length×width dimensions of 22"×22". The density was about 38-39 pcf (pounds per cubic foot) on a dry basis. Three replicate boards of this type were made. The average internal bond strength of these boards was 57.2 psi in a dry, "as-is" state.

EXAMPLE 2

A 1-L glass beaker was charged with pMDI (250 g) and an aromatic petroleum distillate known as Viplex 222 (250 g). The mixture was gently stirred for about 30 s with a metal spatula, which was sufficient to yield a homogenous, single-phase solution. This binder was then used to make OSB panels on a laboratory scale as described in the following paragraph.

Aspen strands were screened in order to remove particles less than ⅛" in size and the residual material was dried to a moisture content of about 2%. A portion of these strands were designated as surface layer strands and were loaded into a blender and sprayed with a liquid phenol/formaldehyde resin produced by Hexion Specialty Chemicals, Incorporated [Springfield, Oreg.], known as W132D, at a loading level of 6%.

These surface layer strands were also sprayed with molten slack wax at a level of 0.75%. A second portion of strands were designated as core layer strands and were loaded into a blender and sprayed with the previously described mixture of pMDI and Viplex 222 at a loading level of 3%. These core layer strands were also sprayed with molten slack wax at a level of 0.75%. The treated strands were formed on a screen into an oriented, 3-layered mat (24"×24") that was comprised of 50% surface layer strands and 50% core layer strands by mass. The mat (with screen) was pressed between hot platens (390° F.) for a total period of 280 s, which included a 60 s closing period and a 30 s decompression period. The resulting board was removed from the press and immediately transferred into a hot oven (176° F.) for a period of 24-hours. The resulting board had a thickness of about 0.720" and was trimmed to length×width dimensions of 22"×22". The density was about 38-39 pcf (pounds per cubic foot) on a dry basis. Three replicate boards of this type were made. The average internal bond strength of these boards was 50.2 psi in a dry, "as-is" state.

EXAMPLE 3

A 1-L glass beaker was charged with pMDI (250 g) and an aromatic petroleum distillate known as Viplex 222 (250 g). The mixture was gently stirred for about 30 s with a metal spatula, which was sufficient to yield a homogenous, single-phase solution. This binder was then used to make OSB panels on a laboratory scale as described in the following paragraph.

Aspen strands were screened in order to remove particles less than ⅛" in size and the residual material was dried to a moisture content of about 2%. A portion of these strands were designated as surface layer strands and were loaded into a blender and sprayed with a liquid phenol/formaldehyde resin produced by Hexion Specialty Chemicals, Incorporated [Springfield, Oreg.], known as W132D, at a loading level of 6%. These surface layer strands were also sprayed with molten slack wax at a level of 0.75%. A second portion of strands were designated as core layer strands and were loaded into a blender and sprayed with the previously described mixture of pMDI and Viplex 222 at a loading level of 2%. These core layer strands were also sprayed with molten slack wax at a level of 0.75%. The treated strands were formed on a screen into an oriented, 3-layered mat (24"×24") that was comprised of 50% surface layer strands and 50% core layer strands by mass. The mat (with screen) was pressed between hot platens (390° F.) for a total period of 280 s, which included a 60 s closing period and a 30 s decompression period. The resulting board was removed from the press and immediately transferred into a hot oven (176° F.) for a period of 24-hours. The resulting board had a thickness of about 0.720" and was trimmed to length×width dimensions of 22"×22". The density was about 38-39 pcf (pounds per cubic foot) on a dry basis. Three replicate boards of this type were made. The average internal bond strength of these boards was 43.1 psi in a dry, "as-is" state.

EXAMPLE 4

A 1-L glass beaker was charged with pMDI (250 g) and an aromatic petroleum distillate known as Viplex 222 (250 g). The mixture was gently stirred for about 30 s with a metal spatula, which was sufficient to yield a homogenous, single-phase solution. This binder was then used to make OSB panels on a laboratory scale as described in the following paragraph.

Aspen strands were screened in order to remove particles less than ⅛" in size and the residual material was dried to a moisture content of about 2%. A portion of these strands were designated as surface layer strands and were loaded into a blender and sprayed with a liquid phenol/formaldehyde resin produced by Hexion Specialty Chemicals, Incorporated [Springfield, Oreg.], known as W132D, at a loading level of 6%. These surface layer strands were also sprayed with molten slack wax at a level of 0.75%. A second portion of strands were designated as core layer strands and were loaded into a blender and sprayed with the previously described mixture of pMDI and Viplex 222 at a loading level of 1%. These core layer strands were also sprayed with molten slack wax at a level of 0.75%. The treated strands were formed on a screen into an oriented, 3-layered mat (24"×24") that was comprised of 50% surface layer strands and 50% core layer strands by mass. The mat (with screen) was pressed between hot platens (390° F.) for a total period of 280 s, which included a 60 s closing period and a 30 s decompression period. The resulting board was removed from the press and immediately transferred into a hot oven (176° F.) for a period of 24-hours. The resulting board had a thickness of about 0.720" and was trimmed to length×width dimensions of 22"×22". The density was about 38-39 pcf (pounds per cubic foot) on a dry basis.

Three replicate boards of this type were made. The average internal bond strength of these boards was 26.2 psi in a dry, "as-is" state.

EXAMPLE 5

A 1-L glass beaker was charged with pMDI (375 g) and an aromatic petroleum distillate known as Viplex 222 (125 g). The mixture was gently stirred for about 30 s with a metal spatula, which was sufficient to yield a homogenous, single-phase solution. This binder was then used to make OSB panels on a laboratory scale as described in the following paragraph.

Aspen strands were screened in order to remove particles less than 1/8" in size and the residual material was dried to a moisture content of about 2%. A portion of these strands were designated as surface layer strands and were loaded into a blender and sprayed with a liquid phenol/formaldehyde resin produced by Hexion Specialty Chemicals, Incorporated [Springfield, Oreg.], known as W132D, at a loading level of 6%. These surface layer strands were also sprayed with molten slack wax at a level of 0.75%. A second portion of strands were designated as core layer strands and were loaded into a blender and sprayed with the previously described mixture of pMDI and Viplex 222 at a loading level of 4%. These core layer strands were also sprayed with molten slack wax at a level of 0.75%. The treated strands were formed on a screen into an oriented, 3-layered mat (24"×24") that was comprised of 50% surface layer strands and 50% core layer strands by mass. The mat (with screen) was pressed between hot platens (390° F.) for a total period of 280 s, which included a 60 s closing period and a 30 s decompression period. The resulting board was removed from the press and immediately transferred into a hot oven (176° F.) for a period of 24-hours. The resulting board had a thickness of about 0.720" and was trimmed to length×width dimensions of 22"×22". The density was about 38-39 pcf (pounds per cubic foot) on a dry basis. Three replicate boards of this type were made. The average internal bond strength of these boards was 84.5 psi in a dry, "as-is" state.

EXAMPLE 6

A 1-L glass beaker was charged with pMDI (375 g) and an aromatic petroleum distillate known as Viplex 222 (125 g). The mixture was gently stirred for about 30 s with a metal spatula, which was sufficient to yield a homogenous, single-phase solution. This binder was then used to make OSB panels on a laboratory scale as described in the following paragraph.

Aspen strands were screened in order to remove particles less than 1/8" in size and the residual material was dried to a moisture content of about 2%. A portion of these strands were designated as surface layer strands and were loaded into a blender and sprayed with a liquid phenol/formaldehyde resin produced by Hexion Specialty Chemicals, Incorporated [Springfield, Oreg.], known as W132D, at a loading level of 6%. These surface layer strands were also sprayed with molten slack wax at a level of 0.75%. A second portion of strands were designated as core layer strands and were loaded into a blender and sprayed with the previously described mixture of pMDI and Viplex 222 at a loading level of 3%. These core layer strands were also sprayed with molten slack wax at a level of 0.75%. The treated strands were formed on a screen into an oriented, 3-layered mat (24"×24") that was comprised of 50% surface layer strands and 50% core layer strands by mass. The mat (with screen) was pressed between hot platens (390° F.) for a total period of 280 s, which included a 60 s closing period and a 30 s decompression period. The resulting board was removed from the press and immediately transferred into a hot oven (176° F.) for a period of 24-hours. The resulting board had a thickness of about 0.720" and was trimmed to length×width dimensions of 22"×22". The density was about 38-39 pcf (pounds per cubic foot) on a dry basis. Three replicate boards of this type were made. The average internal bond strength of these boards was 65.7 psi in a dry, "as-is" state.

EXAMPLE 7

A 1-L glass beaker was charged with pMDI (375 g) and an aromatic petroleum distillate known as Viplex 222 (125 g). The mixture was gently stirred for about 30 s with a metal spatula, which was sufficient to yield a homogenous, single-phase solution. This binder was then used to make OSB panels on a laboratory scale as described in the following paragraph.

Aspen strands were screened in order to remove particles less than 1/8" in size and the residual material was dried to a moisture content of about 2%. A portion of these strands were designated as surface layer strands and were loaded into a blender and sprayed with a liquid phenol/formaldehyde resin produced by Hexion Specialty Chemicals, Incorporated [Springfield, Oreg.], known as W132D, at a loading level of 6%. These surface layer strands were also sprayed with molten slack wax at a level of 0.75%. A second portion of strands were designated as core layer strands and were loaded into a blender and sprayed with the previously described mixture of pMDI and Viplex 222 at a loading level of 2%. These core layer strands were also sprayed with molten slack wax at a level of 0.75%. The treated strands were formed on a screen into an oriented, 3-layered mat (24"×24") that was comprised of 50% surface layer strands and 50% core layer strands by mass. The mat (with screen) was pressed between hot platens (390° F.) for a total period of 280 s, which included a 60 s closing period and a 30 s decompression period. The resulting board was removed from the press and immediately transferred into a hot oven (176° F.) for a period of 24-hours. The resulting board had a thickness of about 0.720" and was trimmed to length×width dimensions of 22"×22". The density was about 38-39 pcf (pounds per cubic foot) on a dry basis. Three replicate boards of this type were made. The average internal bond strength of these boards was 53.1 psi in a dry, "as-is" state.

EXAMPLE 8

A 1-L glass beaker was charged with pMDI (375 g) and an aromatic petroleum distillate known as Viplex 222 (125 g). The mixture was gently stirred for about 30 s with a metal spatula, which was sufficient to yield a homogenous, single-phase solution. This binder was then used to make OSB panels on a laboratory scale as described in the following paragraph.

Aspen strands were screened in order to remove particles less than 1/8" in size and the residual material was dried to a moisture content of about 2%. A portion of these strands were designated as surface layer strands and were loaded into a blender and sprayed with a liquid phenol/formaldehyde resin produced by Hexion Specialty Chemicals, Incorporated [Springfield, Oreg.], known as W132D, at a loading level of 6%. These surface layer strands were also sprayed with molten slack wax at a level of 0.75%. A second portion of strands were designated as core layer strands and were loaded into a blender and sprayed with the previously described mixture of pMDI and Viplex 222 at a loading level of 1%. These core layer strands were also sprayed with molten slack wax at a level of 0.75%. The treated strands were formed on a screen into an oriented, 3-layered mat (24"×24") that was comprised of 50% surface layer strands and 50% core layer strands by mass. The mat (with screen) was pressed between hot platens (390° F.) for a total period of 280 s, which included a 60 s closing period and a 30 s decompression period. The resulting board was removed from the press and immediately transferred into a hot oven (176° F.) for a period of 24-hours. The resulting board had a thickness of about 0.720" and was trimmed to length×width dimensions of 22"×22". The density was about 38-39 pcf (pounds per cubic foot) on a dry basis. Three replicate boards of this type were made. The average internal bond strength of these boards was 41.0 psi in a dry, "as-is" state.

EXAMPLE 9

A 1-L plastic beaker was charged with pMDI (200 g), an aromatic petroleum distillate known as Viplex 222 (192 g) and phenyl acetate (8 g). The mixture was gently stirred for about 30 s with a stainless steel spatula, which was sufficient to yield a homogenous, single-phase solution. This binder was then used to make OSB panels on a laboratory scale as described in the following paragraph.

Aspen strands were dried to a moisture content of about 2% and were then screened in order to remove particles less than ⅛" in size. A portion of these strands were designated as surface layer strands and were loaded into a blender and sprayed with a liquid phenol/formaldehyde resin produced by Hexion Specialty Chemicals, Incorporated [Springfield, Oreg.], known as WD01, at a loading level of 6.5%. These surface layer strands were also sprayed with molten slack wax at a level of 0.75%. A second portion of strands were designated as core layer strands and were loaded into a blender and sprayed with the previously described mixture of pMDI, Viplex 222 and phenyl acetate at a loading level of 4%. These core layer strands were also sprayed with molten slack wax at a level of 0.75%. The treated strands were formed on a screen into an oriented, 3-layered mat (24"×24") that was comprised of 58% surface layer strands and 42% core layer strands by mass. The mat (with screen) was pressed between hot platens (425° F.) for a total period of 220 s, which included a 40 s closing period and a 36 s decompression period. The resulting board was removed from the press and immediately transferred into an insulated hot-box for a period of 24-hours. The resulting board had an out-of-press thickness target of 0.725", was sanded to a target thickness of 0.718", and was then trimmed to length×width dimensions of 18"×18". The density was about 34.5 pcf (pounds per cubic foot) on a dry basis. Two replicate boards of this type were made. The average internal bond strength of these boards was 42.8 psi in a dry, "as-is" state.

EXAMPLE 10

A 1-L plastic beaker was charged with pMDI (200 g), an aromatic petroleum distillate known as Viplex 222 (192 g) and phenyl acetate (8 g). The mixture was gently stirred for about 30 s with a stainless steel spatula, which was sufficient to yield a homogenous, single-phase solution. This binder was then used to make OSB panels on a laboratory scale as described in the following paragraph.

Aspen strands were dried to a moisture content of about 2% and were then screened in order to remove particles less than ⅛" in size. A portion of these strands were designated as surface layer strands and were loaded into a blender and sprayed with a liquid phenol/formaldehyde resin produced by Hexion Specialty Chemicals, Incorporated [Springfield, Oreg.], known as WD01, at a loading level of 6.5%. These surface layer strands were also sprayed with molten slack wax at a level of 0.75%. A second portion of strands were designated as core layer strands and were loaded into a blender and sprayed with the previously described mixture of pMDI, Viplex 222 and phenyl acetate at a loading level of 3%. These core layer strands were also sprayed with molten slack wax at a level of 0.75%. The treated strands were formed on a screen into an oriented, 3-layered mat (24"×24") that was comprised of 58% surface layer strands and 42% core layer strands by mass. The mat (with screen) was pressed between hot platens (425° F.) for a total period of 220 s, which included a 40 s closing period and a 36 s decompression period. The resulting board was removed from the press and immediately transferred into an insulated hot-box for a period of 24-hours. The resulting board had an out-of-press thickness target of 0.725", was sanded to a target thickness of 0.718", and was then trimmed to length×width dimensions of 18"×18". The density was about 34.5 pcf (pounds per cubic foot) on a dry basis. Two replicate boards of this type were made. The average internal bond strength of these boards was 39.5 psi in a dry, "as-is" state.

EXAMPLE 11

A 1-L plastic beaker was charged with pMDI (200 g), an aromatic petroleum distillate known as Viplex 222 (192 g) and phenyl acetate (8 g). The mixture was gently stirred for about 30 s with a stainless steel spatula, which was sufficient to yield a homogenous, single-phase solution. This binder was then used to make OSB panels on a laboratory scale as described in the following paragraph.

Aspen strands were dried to a moisture content of about 2% and were then screened in order to remove particles less than ⅛" in size. A portion of these strands were designated as surface layer strands and were loaded into a blender and sprayed with a liquid phenol/formaldehyde resin produced by Hexion Specialty Chemicals, Incorporated [Springfield, Oreg.], known as WO01, at a loading level of 6.5%. These surface layer strands were also sprayed with molten slack wax at a level of 0.75%. A second portion of strands were designated as core layer strands and were loaded into a blender and sprayed with the previously described mixture of pMDI, Viplex 222 and phenyl acetate at a loading level of 2%. These core layer strands were also sprayed with molten slack wax at a level of 0.75%. The treated strands were formed on a screen into an oriented, 3-layered mat (24"×24") that was comprised of 58% surface layer strands and 42% core layer strands by mass. The mat (with screen) was pressed between hot platens (425° F.) for a total period of 220 s, which included a 40 s closing period and a 36 s decompression period. The resulting board was removed from the press and immediately transferred into an insulated hot-box for a period of 24-hours. The resulting board had an out-of-press thickness target of 0.725", was sanded to a target thickness of 0.718", and was then trimmed to length×width dimensions of 18"×18". The density was about 34.5 pcf (pounds per cubic foot) on a dry basis. Two replicate boards of this type were made. The average internal bond strength of these boards was 26.3 psi in a dry, "as-is" state.

EXAMPLE 12

A 1-L plastic beaker was charged with pMDI (200 g), an aromatic petroleum distillate known as Viplex 222 (192 g) and phenyl acetate (8 g). The mixture was gently stirred for about 30 s with a stainless steel spatula, which was sufficient to yield a homogenous, single-phase solution. This binder was then used to make OSB panels on a laboratory scale as described in the following paragraph.

Aspen strands were dried to a moisture content of about 2% and were then screened in order to remove particles less than ⅛" in size. A portion of these strands were designated as surface layer strands and were loaded into a blender and sprayed with a liquid phenol/formaldehyde resin produced by Hexion Specialty Chemicals, Incorporated [Springfield, Oreg.], known as WD01, at a loading level of 6.5%. These surface layer strands were also sprayed with molten slack wax at a level of 0.75%. A second portion of strands were designated as core layer strands and were loaded into a blender and sprayed with the previously described mixture of pMDI, Viplex 222 and phenyl acetate at a loading level of 1%. These core layer strands were also sprayed with molten slack wax at a level of 0.75%. The treated strands were formed on a screen into an oriented, 3-layered mat (24"×24") that was comprised of 58% surface layer strands and 42% core layer strands by mass. The mat (with screen) was pressed between hot platens (425° F.) for a total period of 220 s, which included a 40 s closing period and a 36 s decompression period. The resulting board was removed from the press and immediately transferred into an insulated hot-box for a period of 24-hours. The resulting board had an out-of-press thickness target of 0.725", was sanded to a target thickness of 0.718", and was then trimmed to length×width dimensions of 18"×18". The density was about 34.5 pcf (pounds per cubic foot) on a dry basis. Two replicate boards of this type were made. The average internal bond strength of these boards was 17.4 psi in a dry, "as-is" state.

While the embodiments of the invention have been illustrated and described, as noted above, many changes can be made without departing from the spirit and scope of the invention. Accordingly, the scope of the invention is not limited by the disclosure of the embodiments. Instead, the invention should be determined entirely by reference to the claims that follow.

What is claimed is:

1. An adhesive for attaching a plurality of raw materials, the adhesive comprising:

an aromatic diisocyanate, the aromatic diisocyanate being present in a quantity of about 90.0 to about 10.0 parts by mass;

an aromatic petroleum distillate, the aromatic petroleum distillate being present in a quantity of about 10.0 to about 90.0 parts by mass; and phenyl acetate present in a quantity of about 0.1 to about 10.0 parts by mass.

2. The adhesive of claim 1 wherein the aromatic diisocyanate is selected from the group consisting of: 2,4'-methylene bis(phenylisocyanate), 4,4'-methylene bis(phenylisocyanate), 1,5'-naphthalenediisocyante, 2,4-toluene diisocyanate, and pMDI.

3. The adhesive of claim 1 wherein the aromatic petroleum distillate has a boiling point in excess of about 220° C. at 760 torr.

4. The adhesive of claim 1 further comprising one or more of the following: a surfactant, a fungicide, an insecticide, a moldicide, and a colorant.

5. The adhesive of claim 1 wherein the plurality of raw materials includes one raw material selected from the group consisting of: strands, particles, flakes, fibers and veneer.

6. An adhesive for attaching a plurality of raw materials, the adhesive comprising:

an aromatic diisocyanate, the aromatic diisocyanate being present in a quantity of about 90.0 to about 10.0 parts by mass;

an aromatic petroleum distillate, the aromatic petroleum distillate being present in a quantity of about 10.0 to about 90.0 parts by mass; and an aromatic ester, the aromatic ester being present in a quantity of about 0.1 to about 10.0 parts by mass and being selected from the group consisting of: phenyl acetate, phenyl salicylate, phenyl benzoate, phenyl carbonate, salicylic acid acetate, 2-naphthyl benzoate, 2-naphthyl lactate, 1-naphthyl salicylate, 2-naphthyl salicylate, n-butylbenzoate, benzyl formate, benzyl acetate, benzyl salicylate, benzyl benzoate, and benzyl fumarate.

7. The adhesive of claim 6 wherein the aromatic diisocyanate is selected from the group consisting of: 2,4'-methylene bis(phenylisocyanate), 4,4'-methylene bis(phenylisocyanate), 1,5'-naphthalenediisocyante, 2,4-toluene diisocyanate, and pMDI.

8. The adhesive of claim 6 wherein the aromatic petroleum distillate has a boiling point in excess of about 220° C. at 760 torr.

9. The adhesive of claim 6 further comprising one or more of the following: a surfactant, a fungicide, an insecticide, a moldicide, and a colorant.

10. The adhesive of claim 6 wherein the plurality of raw materials includes one raw material selected from the group consisting of: strands, particles, flakes, fibers and veneer.

* * * * *